US008236736B2

(12) United States Patent
Leggett et al.

(10) Patent No.: US 8,236,736 B2
(45) Date of Patent: *Aug. 7, 2012

(54) OIL-BASED INSULATING PACKER FLUID

(75) Inventors: Larry H. Leggett, Houston, TX (US);
Charles Svoboda, Katy, TX (US);
Morris Arvie, Jr., Houston, TX (US);
Robert L. Horton, Sugar Land, TX (US); Joyce H. Zhang, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 16 days.

This patent is subject to a terminal disclaimer.

(21) Appl. No.: 12/953,662

(22) Filed: Nov. 24, 2010

(65) Prior Publication Data

US 2011/0065613 A1    Mar. 17, 2011

Related U.S. Application Data

(63) Continuation of application No. 11/538,314, filed on Oct. 3, 2006, now Pat. No. 7,863,223.

(60) Provisional application No. 60/723,029, filed on Oct. 3, 2005.

(51) Int. Cl.
*C09K 8/68* (2006.01)
*C09K 8/36* (2006.01)
*C09K 8/524* (2006.01)
*C02F 5/10* (2006.01)
*E21B 36/00* (2006.01)
*E21B 43/26* (2006.01)

(52) U.S. Cl. ........ 507/203; 507/120; 507/235; 507/239; 166/302; 166/308.4

(58) Field of Classification Search .................. 507/203, 507/120, 235, 239; 166/302, 308.4
See application file for complete search history.

(56) References Cited

U.S. PATENT DOCUMENTS 3,899,026 A    8/1975    Culter
4,258,791 A *  3/1981    Brandt et al. .................. 166/302
4,508,628 A    4/1985    Walker et al.
(Continued)

FOREIGN PATENT DOCUMENTS

EP    0225661 A2    6/1987
(Continued)

OTHER PUBLICATIONS

A New Yield Power Law Analysisi Tool Improves Insulating Annular Fluid Design, paper No. AADE-05-NTCE-49, AADE 2005 National Technical Conference and Exhibit, TX, Apr. 5-7, 2005.* Office Action issued in Canadian Application No. 2,624,563 dated Feb. 16, 2011 (1 page).
Examination Report issued in New Zealand Application No. 567099 dated Mar. 24, 2011 (2 pages).
Office Action issued in corresponding Mexican Application No. MX/a/2008/004355 dated Jun. 6, 2011 (4 pages).
Office Action issued in corresponding European Application No. 06816060.5 dated Jul. 4, 2011 (8 pages).

(Continued)

*Primary Examiner* — Timothy J. Kugel
*Assistant Examiner* — Aiqun Li
(74) *Attorney, Agent, or Firm* — Osha Liang LLP

(57) ABSTRACT

A packer or annular fluid includes a hydrocarbon fluid; and a gelling agent; wherein the packer fluid is a yield power law fluid. A method for preparing a packer fluid includes preparing a mixture of a hydrocarbon fluid, and a gelling agent; heating the mixture to a selected temperature; and shearing the mixture. A method for emplacing a packer fluid into an annulus includes preparing the packer fluid that includes a hydrocarbon fluid and a gelling agent, wherein the packer fluid is a yield power law fluid; and pumping the packer fluid into the annulus.

26 Claims, 1 Drawing Sheet

U.S. PATENT DOCUMENTS

| | | | |
|---|---|---|---|
| 4,528,104 A * | 7/1985 | House et al. | 507/233 |
| 5,278,203 A | 1/1994 | Harms | |
| 5,284,207 A * | 2/1994 | Bittleston et al. | 166/291 |
| 6,511,944 B2 * | 1/2003 | Taylor et al. | 507/237 |
| 6,719,053 B2 * | 4/2004 | Thompson | 166/305.1 |
| 6,908,886 B2 * | 6/2005 | Jones et al. | 507/112 |
| 7,334,639 B2 * | 2/2008 | Svoboda | 166/294 |
| 7,863,223 B2 | 1/2011 | Leggett et al. | |
| 2003/0130135 A1 * | 7/2003 | Hou et al. | 507/200 |
| 2006/0211580 A1 | 9/2006 | Wang et al. | |

FOREIGN PATENT DOCUMENTS

NL          8105189 A     6/1983

OTHER PUBLICATIONS

"Annular Packer Fluids for Paraffin Control: Model Study and Successful Flield Application" James D. Ashford et al.; SPE Production Engineering; Nov. 1990; pp. 351-355.

Office Action issued in corresponding Indian Application No. 2189/CHENP/2008 dated Feb. 1, 2012 (2 pages).

* cited by examiner

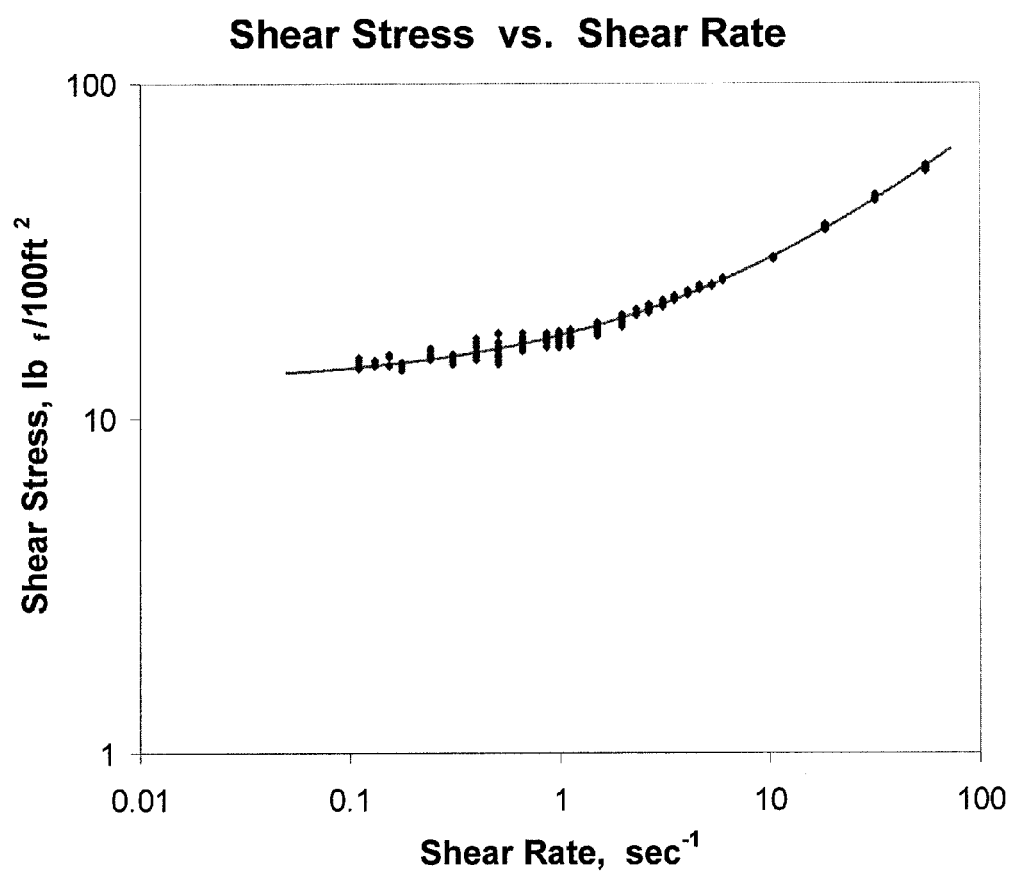

OIL-BASED INSULATING PACKER FLUID

CROSS-REFERENCE TO RELATED APPLICATIONS

This application claims priority under 35 U.S.C. §120 to U.S. patent application Ser. No. 11/538,314, filed on Oct. 3, 2006, which claims the benefit pursuant to 35 U.S.C. §119(e) to U.S. Patent Application Ser. No. 60/723,029, filed Oct. 3, 2005, which is herein incorporated by reference in its entirety.

BACKGROUND OF INVENTION

1. Field of the Invention

The invention relates generally to viscosified, low thermal conductivity annular fluids.

2. Background Art

Annular fluids or packer fluids are liquids which are pumped into annular openings such as, for example, (1) between a wellbore wall and one or more casing strings of pipe extending into a wellbore, or (2) between adjacent, concentric strings of pipe extending into a wellbore, or (3) in one or both of an A- or B-annulus in a wellbore comprising at least an A- and B-annulus with one or more inner strings of pipe extending into a said wellbore, which may be running in parallel or nominally in parallel with each other and may or may not be concentric or nominally concentric with the outer casing string, or (4) in one or more of an A-, B- or C-annulus in a wellbore comprising at least an A-, B- and C-annulus with one or more inner strings of pipe extending into a said wellbore, which may be running in parallel or nominally in parallel with each other and may or may not be concentric or nominally concentric with the outer casing string. Yet alternatively, said one or more strings of pipe may simply run through a conduit or outer pipe(s) to connect one or more wellbores to another wellbore or to lead from one or more wellbores to a centralized gathering or processing center; and said annular fluid may have been emplaced within said conduit or pipe(s) but external to said one or more strings of pipe therein. Insulating annular fluids or insulating packer fluids are annular fluids or packer fluids used to control heat loss—both conductive and convective heat losses. These insulating annular or packer fluids are especially necessary in oil or gas well construction operations conducted in low temperature venues of the world, for example, those areas having permafrost. Permafrost is a thick layer of frozen surface ground found often in arctic or Antarctic regions which frozen ground may be several hundred feet thick and presents a great obstacle to the removal of relatively warm fluids through a well pipe penetrating said frozen ground. Particularly, warm fluid in the well pipe causes thawing of the permafrost in the vicinity of the well resulting in subsidence which can irreparably impair the permafrost environment and impose compressive and/or tension loads high enough to rupture or collapse the well casing and hence allow the escape of well fluids. In addition, the warm gas or oil coming to the surface in the well pipe becomes cooled by giving up its heat to the permafrost. Further, gas hydrate crystals may form, which can freeze together and block the well pipe; alternatively, wax or asphaltenes may form, which can agglomerate and block the well pipe. Generally, except for a tiny contribution from radiation, annular heat loss is due to convection and to conduction.

Heavy oil production is another operation which often can benefit from the use of an insulating annular fluid. In heavy oil production, a high-pressure steam or hot water is injected into the well and the oil reservoir to heat the fluids in the reservoir, causing a thermal expansion of the crude oil, an increase in reservoir pressure and a decrease of the oil's viscosity. In this process, damage to the well casing may occur when heat is transferred through the annulus between the well tubing and the casing. The resulting thermal expansion of the casing can break the bond between the casing and the surrounding cement, causing leakage. Accordingly, an insulating medium such as a packer fluid may be used to insulate or to help insulate the well tubing. The packer fluid also reduces heat loss and saves on the energy requirements in stimulation using hot-water or steam (huff-n-puff) or in hot-water- or steam-flooding.

In addition to steam injection processes and operations which require production through a permafrost layer, subsea fields—especially, subsea fields in deep water, 1,500 to more than 6,000 feet deep—require specially designed systems, which typically require an insulating annular or packer fluid. For example, a subsea oil reservoir temperature may be between about 120° F. and 250° F., while the temperature of the water through which the oil must be conveyed is often as low as 32° F. to 50° F. Conveying the high temperature oil through such a low temperature environment can result in oil temperature reduction and consequently the separation of the oils into various hydrocarbon fractions and the deposition of paraffins, waxes, asphaltenes, and gas hydrates. The agglomeration of these oil constituents can cause blocking or restriction of the wellbore, resulting in significant reduction or even catastrophic failure of the production operation.

To meet the above-discussed insulating demands, a variety of packer fluids have been developed. For example, U.S. Pat. No. 3,613,792 describes an early method of insulating wellbores. In the U.S. Pat. No. 3,613,792, simple fluids and solids are used as the insulating medium. U.S. Pat. No. 4,258,791 improves on these insulating materials by disclosing an oleaginous liquid such as topped crude oils, gas oils, kerosene, diesel fluids, heavy alkylates, fractions of heavy alkylates and the like in combination with an aqueous phase, lime, and a polymeric material. U.S. Pat. No. 4,528,104 teaches a packer fluid comprised of an oleaginous liquid such as diesel oil, kerosene, fuel oil, lubricating oil fractions, heavy naphtha and the like in combination with an organophilic clay gellant and a clay dispersant such as a polar organic compound and a polyfunctional amino-silane.

Gelled hydrocarbons have been successfully used as packer fluids because the hydrocarbon fluids have low thermal conductivities, while gel formation increases the viscosities of the fluids. The increased viscosity minimizes fluid movement in packer fluids, leading to reduced or minimized convective heat loss.

Polyvalent metal (typically, ferric iron or aluminum) salts of phosphoric acid esters have been successfully used as gelling agents for forming high viscosity gelled hydrocarbon fluids. Description of these fluids and their uses can be found in U.S. Pat. Nos. 4,507,213 issued to Daccord et al., 4,622, 155 issued to Harris et al., 5,190,675 issued to Gross, and 5,846,915 issued to Smith et al. More recently, U.S. Pat. No. 6,511,944 issued to Taylor et al. discloses gelled hydrocarbon fracture fluids that include ferric iron or aluminum polyvalent metal salts of phosphonic acid esters, instead of phosphoric acid esters. Unfortunately, these gelled hydrocarbon fracture fluids are power law fluids rather than yield power law fluids, i. e., they exhibit no yield stress: $\tau_y=0$. These patents are hereby incorporated herein by reference even though the present disclosure improves upon them, among other ways, by teaching how to make the fluids into yield power law fluids, i. e., those that exhibit $\tau_y \neq 0$.

Another short-coming of hydraulic fracturing fluids has been their limited stability—after all, they need only last a matter of hours, since even a massive hydraulic fracturing job involving 2,000,000 pounds of proppant is typically concluded in less than 8 hours. Although these fluids have worked well in the hydraulic fracturing application, there is still a need for insulating annular or packer fluids that are stable for extended periods, low in thermal conductivity, and simultaneously inhibitive of convective heat loss.

SUMMARY OF INVENTION

In one aspect, the present invention relates to packer fluids. A packer fluid in accordance with one embodiment of the invention includes a hydrocarbon fluid and a gelling agent, wherein the packer fluid is a yield power law fluid.

In another aspect, the present invention relates to methods for preparing a packer fluid. A method in accordance with one embodiment of the invention includes preparing a mixture of a hydrocarbon fluid and a gelling agent; heating the mixture to a selected temperature; and shearing the mixture.

In another aspect, the present invention relates to methods for emplacing a packer fluid into an annulus. A method in accordance with one embodiment of the invention includes preparing the annular fluid that includes a hydrocarbon fluid and a gelling agent, wherein the packer fluid is a yield power law fluid; and pumping the packer fluid into one or more annuli.

Other aspects and advantages of the invention will be apparent from the following description and the appended claims.

BRIEF DESCRIPTION OF THE DRAWINGS

FIG. 1 shows a chart of shear stress vs. shear rate for a yield power law packer fluid in accordance with one embodiment of the invention.

DETAILED DESCRIPTION

Embodiments of the present disclosure relate to insulating packer fluids and methods of preparing and emplacing such fluids. Packer fluids according to the present disclosure have good long-term insulation properties, because they resist syneresis and separation of various components into separate phases, and have low thermal conductivities and unique rheological properties that minimize their movement once they are emplaced—and this minimization of movement, in turn, minimizes convective heat loss.

A majority of annular heat loss is due to convection and conduction. Heat loss due to thermal conductivity may be controlled by proper selection of fluids, i.e., fluids with low thermal conductivities, while heat loss due to convection can be arrested or substantially diminished by increased viscosities of the fluids. For example, thermal conductivities as low as 0.07 btu/(hr·ft·° F.) can be obtained with gelled diesel or other hydrocarbon-based insulating annular fluid.

Gelled hydrocarbons have been successfully used as hydraulic fracturing fluids, as described in a number of patents and publications, such as U.S. Pat. Nos. 3,757,864 issued to Crawford et al., 4,104,173 issued to Gay et al., 4,200,539 issued to Burnham et al. and 4,507,213 issued to Daccord et al., which are herein incorporated by reference in their entireties. In fracturing fluids, high viscosity is important for suspending the proppants. On the other hand, it is undesirable for a fracturing fluid to have minimal mobility because it needs to be pumped into the well and the fractures. In contrast, minimization or elimination of fluid movement is highly desirable for packer fluids once they are emplaced in the annulus.

Packer fluids in accordance with embodiments of the present disclosure are gelled oil-based (hydrocarbon-based) fluids having yield power law (Herschel-Bulkley) characteristics. Yield power law fluids have complex non-Newtonian rheological behavior. A yield power law fluid does not start to move until an applied stress (force) exceeds its yield stress. Thus, a yield power law packer fluid will remain in place (i.e., is not prone to movement) once it is emplaced in the annulus. This resistance to movement may ensure that thermal loss due to convention is substantially minimized or eliminated. On the other hand, yield power law fluids tend to have relatively low high-shear-rate viscosity, making them easier to place and displace. That is, yield power law fluids may be pumped with relatively ease into annuli during emplacement, as long as the applied stress from pumping exceeds the yield stress. For a discussion of tools for analyzing yield power law fluids, please see Horton, et al., "*A New Yield Power Law Analysis Tool Improves Insulating Annular Fluid Design*," paper No. AADE-05-NTCE-49, AADE 2005 National Technical Conference and Exhibit, Houston, Tex., Apr. 5-7, 2005.

As discussed in Horton, "[a]n engineering design tool . . . for 'yield power law well-bore temperature profile' program [,] was created to simulate well bore temperatures during production, shut-in and injection. The program solves the energy equation for multiple casings. The solutions depend on the physical properties of the annular fluids, sea floor, wellbore geometry, and geological boundary conditions, and the fluids' configuration in the wellbore. The following parameters were studied: [b]ottom-hole temperature (BHT), [r]heological properties of both oil-based and water-based power law (PL) and yield power law (YPL) fluids, [t]hermal conductivity, [w]ell depth (TVD), [t]hickness of a gas-filled A-annulus (with an insulating-fluid-filled B-annulus) . . . , [h]eat capacity, [l]ocation of the interface between gas {low pressure nitrogen} and brine in a gas-filled A-annulus, [t]hickness of an insulating-fluid-filled A-annulus with no B-annulus, [o]il flow rate, [l]ocation below the mud line of the bottom of the insulating fluid, [s]eawater flow rate, and [c]oefficient of thermal expansion." Because low thermal conductivity was determined to be a key parameter of the YPL fluids, M-I SWACO built a thermal conductivity tester, which was employed to measure thermal conductivity of fluids such as those discussed in the Horton paper.

As discussed in the Horton paper, one simulation using the yield power law well-bore temperature profile program depicted a "dry tree" completion producing oil in deep water in the Gulf of Mexico. According to the simulation, the wellbore thermal environment was shown to have warmed to a steady state (from an initial state of long-term shut-in) during production, after which the well was shut in for an extended period and allowed to cool to a second steady state that was similar to the initial state. In this simulation, the produced oil exhibited a hydrate formation temperature of 68° F. at bottom-hole producing pressure (BHSP). This required the user of the program to know the shut-in time for the well to cool to 68° F. in the center of the producing stream ($SIT_{68}$) so that an intervention could be scheduled for the well. If it was determined that the scheduled intervention time could extend beyond 16 hours, hydrate problems would need to be prevented by displacing the well with a non-hydrate-forming fluid to at least about one-third-way between mud line (ML) and well depth (TVD) to avoid hydrate problems in an event longer than 16 hours.

According to the Horton paper, "because water-based YPL fluids of similar rheological properties can readily be formulated, it [is] considered a good approximation to consider both oil-based and water-based YPL fluids as having the same rheological properties."

As mentioned above, gelled hydrocarbons have long been successfully used as hydraulic fracturing fluids. In fracturing fluids, the characteristic of high viscosity is important for suspending the proppants but high mobility is also needed for getting the proppant slurry down the well and out into the fracture. These somewhat contradictory objectives can be achieved by way of a shear-dependent viscosity, such as that characterized by the Power Law, equation 1:

$$\tau = K \cdot \dot{\gamma}^{n_m} \quad (1)$$

where
$\tau$ is the shear stress (lb$_f$/100 ft$^2$),
K is the consistency factor,
$\dot{\gamma}$ is the shear rate (s$^{-1}$), and
$n_m$ is the flow behavior index.

Hydraulic fracturing fluids are typically selected such that they exhibit a flow behavior indices in the 0.5 to 0.8 range and a suitable value of the consistency factor so that they will be sufficiently viscous at moderate shear rate to carry proppant efficiently and also sufficiently mobile at high shear rate to allow the proppant slurry to move readily down the well and out into the fracture. However, hydraulic fracturing fluids seldom encounter the low shear rate range that insulating annular fluids experience most of the time. For the latter, what is shown clearly in the paper No. AADE-05-NTCE-49 by Horton, et al., mentioned above, is that rheological behavior is needed that is different from the power law behavior, especially in the 0.3 to 0.003 sec$^{-1}$ shear rate range. For these insulating annular fluids, what is needed is not only a somewhat lower flow behavior index (preferably in the 0.4 to 0.7 range), but also a relatively large value of the yield stress (also referred to as $\tau_y$), in the range of 10 to 105 lb$_f$/100 ft$^2$ as given in the Yield Power Law Equation (also known as the Herschel-Bulkley Equation), which is as follows:

$$\tau = \tau_y + K_m \cdot \dot{\gamma}^{n_m} \quad (2)$$

where
$\tau$ is the shear stress as in Equation 1,
$\tau_y$ is the yield stress (lb$_f$/100 ft$^2$),
$K_m$ is the consistency factor,
$\dot{\gamma}$ is the shear rate (s$^{-1}$), and
$n_m$ is the flow behavior index.

The shear rate environment of working insulating annular fluids is such that, while the fluid is being emplaced or displaced, $\tau_y$, in the range of 10 to 105 lb$_f$/100 ft$^2$, is relatively unimportant compared with the other parameters given in Equation 2; but the converse is true for the majority of the lifetime of a working insulating annular fluid—the extended period of time between emplacement and displacement. This latter fact is the reason why a conventional hydraulic fracturing fluid is generally not well suited for use as an insulating packer fluid.

In accordance with some embodiments of the present disclosure, packer fluids may be based on conventional gelled hydrocarbons, but further include rheological additives to produce yield power law fluids. Conventional gelled hydrocarbons may be obtained by introducing phosphoric acid esters and an aluminum (or ferric) compound into hydrocarbon base fluids. These gelled hydrocarbon fluids have a three-dimensional polymer element in the hydrocarbons. The three-dimensional polymer element causing the gelling is constituted by phosphoric acid esters bonded (complexed) with aluminum or ferric cations. The presence of long alkyl side chains on the phosphoric acid ester render these polymer elements soluble in the hydrocarbons.

However, these conventional gelled hydrocarbon fluids are power law fluids or Newtonian law fluids; these fluids will move in response to any exerted force, including a small force. In contrast, packer fluids of the present disclosure include rheological additives that change these fluids from power law fluids to yield power law fluids. Yield power law fluids will not move until the exerted stress (force) exceeds the yield stress of the fluids. As noted above, yield power fluids are more preferred as packer fluids because they will not move in response to minor stress (e.g., vibration) from various activities in the well.

A packer fluid in accordance with embodiments of the present disclosure comprises hydrocarbon base fluids, a gelling agent, and a rheological additive that makes the gelled hydrocarbons behave like a yield power law fluid. One of ordinary skill in the art would appreciate that various rheological additives may be used to impart a fluid with the desired yield power law characteristics. Suitable rheological additives in accordance with embodiments of the present disclosure, for example, may include alkyl diamides, such as those having a general formula: $R_1$—HN—CO—(CH$_2$)$_n$—CO—NH—$R_2$, wherein n is an integer from 1 to 20, more preferably from 1 to 4, yet more preferably from 1 to 2, and $R_1$ is an alkyl groups having from 1 to 20 carbons, more preferably from 4 to 12 carbons, and yet more preferably from 5 to 8 carbons, and $R_2$ is hydrogen or an alkyl group having from 1 to 20 carbons, or more preferably is hydrogen or an alkyl group having from 1 to 4 carbons, wherein $R_1$ and $R_2$ may or may not be identical. Such alkyl diamides may be obtained, for example, from M-I L.L.C. (Houston, Tex.) under the trade name of VersaPac™.

VersaPac™ has been used as a thermally activated gelling agent, which generates viscosity and develops gel structure when sheared and heated to a temperature above 60° C. When VersaPac™ is fully activated, the gel structure remains stable even if the temperature drops below 60° C. However, when used at a temperature above its melting point (120° C.), the rheological effect gradually decreases.

VersaPac™ is activated by a combination of heat and shear. In the absence of shear and below the temperature of activation, the rheological effect of VersaPac™ is minimal because the particles do not swell. The gelling mechanism involves the swelling of the initial agglomerates and a gradual release of individual oligomer chains. The released oligomers then associate with other particulate material to produce the rheological effect. The build-up of this structure is thixotropic as it involves re-alignment of the initial structure to the most thermodynamically stable configuration. When totally activated, a type of micelle structure is formed involving the gelling agent and the other components in the system.

In accordance with some embodiments of the present disclosure, packer fluids may be based on gelled hydrocarbons wherein the gelling agent comprises poly-(ethylene-co-chloroethylene-co-[sodium chloroethylene-sulfonate]) (which is available, for example, as product XRP 032 from Eliokem, Inc., 1452 East Archwood Avenue, Akron, Ohio 44306), or an emulsion formed from an emulsifier and a water-miscible internal phase.

In accordance with some embodiments of the present disclosure, a packer fluid comprises a rheological additive, as noted above, added to a hydrocarbon fluid that includes one or more gelling agents, such as phosphoric acid esters in the presence of a ferric or aluminum compound. The hydrocarbons, for example, may be diesels, paraffin oils, crude oils, kerosene, or mixtures thereof. The phosphoric acid esters may have same or different alkyl groups, having various lengths. In accordance with embodiments of the invention, the alkyl groups (i.e., the ester parts) of the phosphoric acid esters have two or more carbon atoms, and preferably at least one of the alkyl groups has 3 to 10 carbon atoms. The ferric or aluminum compounds may be organic or inorganic compounds, such as aluminum chloride, aluminum alkoxide, ferric chloride, organometallic complexes of aluminum or iron (III), amine carboxylic acid salts of aluminum or iron(III), etc.

The phosphoric acid esters having a desired alkyl group may be prepared using phosphorous pentaoxide and triethyl phosphate (TEP) (or other similar phosphate triesters) in the presence of a trace amount of water:

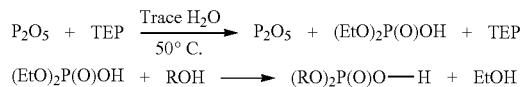

In the reactions shown above, the tri-ethyl phosphate ester (TEP) is partially hydrolyzed to produce a phosphoric acid diethyl ester. The phosphoric acid diethyl ester is then transesterified with a selected alcohol (ROH) to regenerate a phosphoric acid dialkyl ester having at least one and often two ester alkyl groups derived from the ROH.

The alcohol (ROH), i.e., the length of the alkyl chain R, may be selected to provide the desired hydrophobicity. In accordance with embodiments of the invention, the alcohols (ROH) have 2 or more carbons (i.e., ethanol or higher), and preferably, 2 to 10 carbons, which may be straight or branched chains. The phosphoric acid dialkyl esters having the alkyl chain of 2-10 carbons long may be obtained from M-I L.L.C. (Houston, Tex.) under the trade name of ECF-976. In accordance with some embodiments of the invention, the R group may include aromatic or other functional groups, as long as it can still provide proper solubility in the hydrocarbon base fluids.

One of ordinary skill in the art would appreciate that various other reactions may be used to prepare the desired phosphoric esters without departing from the scope of the invention. For example, phosphoric acid esters may be prepared using phosphorous hemipentaoxide (or phosphorous pentaoxide $P_2O_5$) and a mixture of long chain alcohols, as disclosed in U.S. Pat. No. 4,507,213:

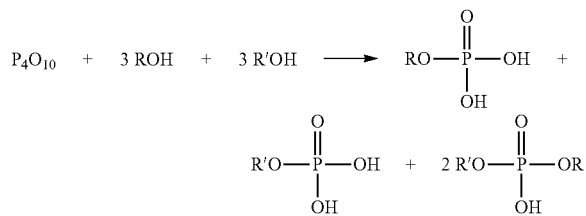

This reaction produces a mixture of phosphoric acid monoesters and diesters. Furthermore, while the above reaction is shown with two different alcohols, the same reaction may also be performed with one kind of alcohol to simplify the product composition. Note that embodiments of the invention may use a mixture of phosphoric acid esters, i.e., not limited to the use of a pure phosphoric acid ester. As used herein, "phosphoric acid esters" include mono acid di-esters and di-acid monoesters. Furthermore, instead of or in addition to phosphoric esters, embodiments disclosed herein may also use phosphonic acid esters, as disclosed in U.S. Pat. No. 6,511,944 issued to Taylor et al. A phosphonic acid ester has an alkyl group directly bonded to the phosphorous atom and includes one acid and one ester group. One of ordinary skill in the art would also recognize that other types of gelling agents may be used including anionic polymers, such as poly-(ethylene-co-chloroethylene-co-[sodium chloroethylene-sulfonate]), or emulsions formed from an emulsifier and a water-miscible internal phase. Depending on the rheological properties of a fluid formed with these gelling agents, and whether gelling agent itself imparts a fluid with the desired yield power law characteristics, rheological additives may optionally be included.

A packer fluid in accordance with one embodiment of the invention may be prepared as follows: a base fluid of hydrocarbons, a gelling agent comprising a phosphoric acid ester (e.g., ECF-976 from M-I L.L.C.) or a phosphonic acid ester complexing with a multivalent metal ion (e.g., ferric or aluminum ion, or ECF-977 from M-I L.L.C.), and a rheological additive (e.g., VersaPac™ alkyl diamides) are mixed in a blender (to shear the mixture) at an elevated temperature (e.g., 180° F., about 80° C.) to facilitate the dissolution or swelling of the dialkyl diamide. The base fluid may comprise, for example, diesels, a mixture of diesels and paraffin oil (e.g., 85%:15% mixture), mineral oil, IO 16-18™, Saraline 185V™, or Safe-Solv OM™, and Safe-T-Pickle™ from M-I L.L.C., EDC99 DW™ from TOTAL, or PureDrill HT-40™ from PetroCanada. In addition, a packer fluid in accordance with some embodiments of the invention may further comprise other components that are commonly used in such fluids, such as emulsifiers and inorganic salts (e.g., calcium chloride, calcium bromide, etc.). Examples of emulsifiers include those sold under the trade name of VersaMul™ and VersaCoat™ by M-I L.L.C. (Houston, Tex.). For example, a packer fluid of the invention may comprise a blend of diesel with about 3-9 ppb (pounds per barrel) Ecotrol RD™ (an oil soluble polymer) and about 3-9 ppb VersaPac™. One of ordinary skill in the art would appreciate that the gelling agents and the rheological additives may be added in a suitable amount for the desired properties.

Since VersaPac™ (or similar alkyl diamides) are barely soluble in oil-based fluids, an alternative method of preparation involves first preparing a slurry (e.g., an 1:1 slurry) of VersaPac™ in an appropriate solvent (e.g., propylene glycol, polypropylene glycol, or other similar solvents). This preparation may be performed with a blender at a lower temperature (e.g., 135° F., about 58° C.). This slurry is then added to the oil-based fluids and the gelling agents. Alternatively, instead of first preparing a slurry of VersaPac™ in said appropriate solvent, the VersaPac™ and then said appropriate solvent may simply be added to the oil-based fluids and the preparation may then be performed with a blender at a lower temperature (e.g., 135° F., about 58° C.). Then the gelling agent comprising a phosphoric acid ester (e.g., ECF-976 from M-I L.L.C.) or a phosphonic acid ester complexing with a multivalent metal ion (e.g., ferric or aluminum ion, or ECF-977 from M-I L.L.C.), is subsequently added to this mixture. And, as yet another alternative, instead of first preparing a slurry of VersaPac™ in said appropriate solvent, the said appropriate solvent and then the VersaPac™ may simply be added to the oil-based fluids and the preparation may then be performed with a blender at a lower temperature (e.g., 135° F., about 58° C.). Then the gelling agent comprising a phosphoric acid ester (e.g., ECF-976 from M-I L.L.C.) or a phosphonic acid ester complexing with a multivalent metal ion (e.g., ferric or aluminum ion, or ECF-977 from M-I L.L.C.), is subsequently added to this mixture. Of these three possible alternatives, the latter is slightly preferred over the other two; and all three of these alternatives (because they involve heating and shearing to only 135° F.) are slightly preferred over the alternative of adding all components at once and subjecting the mixture to heating and shearing to 180° F. In addition, it will be obvious to one skilled in the art that other methods may also be used to effect the same result.

FIG. 1 shows shear stress as a function of shear rate at 140° F. for a packer fluid in accordance with one embodiment of the invention. As shown in FIG. 1, the data point fit a curve according to the "yield power law" equation (Herschel-Bulkley equation):

$$\tau = \tau_0 + K_m \gamma \&^{n_m}$$

where $\tau$ is the shear stress ($lb_f/100\ ft^2$), $\tau_0$ is the yield stress ($lb_f/100\ ft^2$), $K_m$ is a consistency factor (which is equivalent to viscosity when $\tau_0$ approaches 0 and $n_m$ approaches 1.0, i.e., Newtonian behavior) (units are $lb_f sec^n/100\ ft^2$), $\gamma\&$ is the shear strain rate ($s^{-1}$), and $n_m$ is the flow behavior index, which is a unitless exponential parameter whose values typically range from 0.3 to 1.0. The curve fitting yields $n_m=0.539$, $K_m=5.07\ lb_f sec^n/100\ ft^2$, and $\tau_0=12.70\ lb_f/100\ ft^2$, which clearly shows a yield power law fluid. A Newtonian or simple power law fluid will have a zero yield stress value ($\tau_0$).

In another embodiment of the present disclosure, a yield power law fluid may be prepared as follows: a base fluid of hydrocarbons and a gelling agent comprising poly-(ethylene-co-chloroethylene-co-[sodium chloroethylene-sulfonate]) (which is available, for example, as product XRP 032 from Eliokem, Inc., 1452 East Archwood Avenue, Akron, Ohio 44306) may be mixed in a low-shear blender at a moderately elevated temperature (e.g., 122 to 140° F., about 50 to 60° C.) to facilitate the dissolution or swelling of the copolymer. Optionally, a dialkyl diamide and/or a phosphoric acid ester (e.g., ECF 976 from M-I L.L.C.) or a phosphonic acid ester complexing with a multivalent metal ion (e.g., ferric or aluminum ion, or ECF 977 from M-I L.L.C.) may be added. The base fluid may comprise, for example, diesels, a mixture of diesels and paraffin oil (e.g., 85%:15% mixture), mineral oil, IO 16-18™, Saraline 185V™, or Safe-Solv OM™, and Safe-T-Pickle™ from M-I L.L.C., EDC99 DW™ from TOTAL, or PureDrill HT-40™ from PetroCanada. In addition, a packer fluid in accordance with some embodiments of the present disclosure may further comprise other components that are commonly used in such fluids, such as emulsifiers and inorganic salts (e.g., calcium chloride, calcium bromide, etc.). One of ordinary skill in the art would appreciate that the gelling agents and the rheological additives may be added in a suitable amount for the desired properties.

In yet another embodiment of the present disclosure, a yield power law fluid may be prepared as follows: a base fluid of hydrocarbons and a gelling agent comprising a combination of an emulsifier (which is available, for example, as product Surfazol 1000 from The Lubrizol Corp., 29400 Lakeland Blvd., Wickliffe, Ohio 44092) and a water-miscible internal phase are mixed in a low-shear blender at a moderately elevated temperature (e.g., 122 to 140° F., about 50 to 60° C.) to facilitate the initiation of emulsification, which is continued by hot-rolling the mixture at 150° F. (about 66° C.) overnight.

The water-miscible internal phase may be supplied from a dense brine such as 19.2 ppg zinc-calcium bromide brine in a ratio such that the volumetric ratio of external to internal phase is maintained around 88.8:11.2 to keep the density of the product yield power law fluid above about 8.60 ppg and the thermal conductivity below about 0.085 BTU/hr·ft·° F. In one embodiment, the water-miscible internal phase may be supplied from a dense brine such as 14.2 ppg calcium bromide brine in a ratio such that the volumetric ratio of external to internal phase is maintained around 80.8:19.2 to keep the density of the product yield power law fluid above about 8.60 ppg and the thermal conductivity below about 0.108 BTU/hr·ft·° F. In another embodiment, the water-miscible internal phase may be supplied from a dense brine such as 11.6 ppg calcium chloride brine in a ratio such that the volumetric ratio of external to internal phase is maintained around 69.2:30.8 to keep the density of the product yield power law fluid above about 8.60 ppg and the thermal conductivity below about 0.143 BTU/hr·ft·° F.

In yet another embodiment, the water-miscible internal phase may be supplied from a dense water-miscible but water-free fluid such as a solution of zinc bromide and calcium bromide in ethylene glycol, propylene glycol, diethylene glycol, or triethylene glycol. In a further embodiment, the water-miscible internal phase may be supplied from a mixture of an ordinary dense brine with a dense water-miscible but water-free fluid such as a solution of zinc bromide and calcium bromide in ethylene glycol, propylene glycol, diethylene glycol, or triethylene glycol. In yet another embodiment, the water-miscible internal phase may be supplied from a mixture of an ordinary dense brine with a dense water-miscible but water-free fluid such as a solution of calcium bromide in ethylene glycol, propylene glycol, diethylene glycol, or triethylene glycol.

Optionally a dialkyl diamide may be added and/or a phosphoric acid ester (e.g., ECF 976 from M-I L.L.C.) or a phosphonic acid ester complexing with a multivalent metal ion (e.g., ferric or aluminum ion, or ECF 977 from M-I L.L.C.) may be added. The base fluid may comprise, for example, diesels, a mixture of diesels and paraffin oil (e.g., 85%:15% mixture), mineral oil, IO 16-18™, Saraline 185V™, or Safe-Solv OM™, and Safe-T-Pickle™ from M-I L.L.C., EDC99 DW™ from TOTAL, or PureDrill HT-40™ from PetroCanada. In addition, a packer fluid in accordance with some embodiments of the present disclosure may further comprise other components that are commonly used in such fluids, such as emulsifiers and inorganic salts (e.g., calcium chloride, calcium bromide, etc.). One of ordinary skill in the art would appreciate that the gelling agents and the rheological additives may be added in a suitable amount for the desired properties.

Advantages of the invention may include one or more of the following. Packer fluids in accordance with embodiments disclosed herein have yield power law characteristics such that they are not prone to movement once they are emplaced in an annulus. Minimization of movements in these fluids reduces convective heat loss to a minimum. These yield power law fluids can still be pumped during emplacement and displacement. The base fluids may be selected from various hydrocarbons such that they will have inherently low thermal conductivity and suit particular applications, e.g., deepwater or Arctic/Antarctic areas.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A packer fluid, comprising:
    a hydrocarbon fluid; and
    a gelling agent;
    wherein the packer fluid is a yield power law fluid.

2. The packer fluid of claim 1, wherein the packer fluid further comprises a rheological additive.

3. The packer fluid of claim 1, wherein the gelling agent comprises a multivalent metal ion and at least one ester selected from the group consisting of a phosphoric acid ester and a phosphonic acid ester.

4. The packer fluid of claim 3, wherein the multivalent metal ion is at least one selected from the group consisting of a ferric ion and an aluminum ion.

5. The packer fluid of claim 2, wherein the rheological additive is an alkyl diamide having a formula: $R_1$—HN—CO—$(CH_2)_n$—CO—NH—$R_2$, wherein n is an integer from 1 to 20, $R_1$ is an alkyl groups having from 1 to 20 carbons, and $R_2$ is hydrogen or an alkyl group having from 1 to 20 carbons.

6. The packer fluid of claim 1, wherein the hydrocarbon fluid comprises at least one selected from diesel, a mixture of diesels and paraffin oil, mineral oil, and isomerized olefins.

7. The packer fluid of claim 2, wherein the rheological additive is present at a concentration of 3-13 pounds per barrel.

8. The packer fluid of claim 1, wherein the gelling agent comprises an anionic polymer.

9. The packer fluid of claim 8, further comprising at least one of a rheological additive, a phosphoric acid ester, a phosphonic acid ester, and complexes of phosphoric acid esters or phosphonic acid esters.

10. The packer fluid of claim 1, wherein the gelling agent comprises an emulsifier and a water-miscible internal phase.

11. The packer fluid of claim 10, further comprising at least one of a rheological additive, a phosphoric acid ester, a phosphonic acid ester, and complexes of phosphoric acid esters or phosphonic acid esters.

12. A method for emplacing a packer fluid into an annulus, comprising:
preparing the packer fluid comprising:
a hydrocarbon fluid, and
a gelling agent,
wherein the packer fluid is a yield power law fluid; and
pumping the packer fluid into the annulus.

13. The method of claim 12, wherein the packer fluid further comprises a rheological additive.

14. The method of claim 13, wherein the packer fluid further comprises a solvent for said rheological additive.

15. The packer fluid of claim 1, wherein the packer fluid comprises diesel, an oil-soluble polymer, and an alkyl diamide.

16. The packer fluid of claim 15, wherein the alkyl diamide comprises a formula: $R_1$—HN—CO—$(CH_2)_n$—CO—NH—$R_2$, wherein n is an integer from 1 to 20, $R_1$ is an alkyl groups having from 1 to 20 carbons, and $R_2$ is hydrogen or an alkyl group having from 1 to 20 carbons.

17. The method of claim 12, wherein the packer fluid further comprises diesel, an oil-soluble polymer, and an alkyl diamide.

18. The method of claim 17, wherein the alkyl diamide comprises a formula: $R_1$—HN—CO—$(CH_2)_n$—CO—NH—$R_2$, wherein n is an integer from 1 to 20, $R_1$ is an alkyl groups having from 1 to 20 carbons, and $R_2$ is hydrogen or an alkyl group having from 1 to 20 carbons.

19. The packer fluid of claim 1, wherein the gelling agent comprises at least an alkyl diamide.

20. The packer fluid of claim 19, wherein the alkyl diamide has a formula: $R_1$—HN—CO—$(CH_2)_n$—CO—NH—$R_2$, wherein n is an integer from 1 to 20, $R_1$ is an alkyl groups having from 1 to 20 carbons, and $R_2$ is hydrogen or an alkyl group having from 1 to 20 carbons.

21. A packer fluid, comprising:
a hydrocarbon fluid; and
a gelling agent;
wherein the packer fluid is a yield power law fluid, and wherein the gelling agent is not an alkyl diamide.

22. The packer fluid of claim 21, further comprising an oil soluble polymer.

23. The packer fluid of claim 21, wherein the gelling agent comprises at least one of: a multivalent metal ion, a phosphoric acid ester, a phosphonic acid ester; an anionic polymer; complexes of phosphoric acid esters; complexes of phosphonic acid esters; an emulsifier and water-miscible internal phase; or an oil-soluble polymer.

24. The packer fluid of claim 23, wherein the multivalent metal ion is at least one selected from the group consisting of a ferric ion and an aluminum ion.

25. The packer fluid of claim 21 further comprising a rheological additive.

26. The packer fluid of claim 21, wherein the hydrocarbon fluid comprises at least one selected from diesel, a mixture of diesels and paraffin oil, mineral oil, and isomerized olefins.

* * * * *